(12) United States Patent
Dik

(10) Patent No.: US 7,383,437 B1
(45) Date of Patent: Jun. 3, 2008

(54) METHOD AND SYSTEM FOR IMPLEMENTING SUPER-USER-COMPATIBLE PRIVILEGES

(75) Inventor: Casper H. S. Dik, Amsterdam (NL)

(73) Assignee: Sun Microsystems, Inc., Santa Clara, CA (US)

( * ) Notice: Subject to any disclaimer, the term of this patent is extended or adjusted under 35 U.S.C. 154(b) by 1002 days.

(21) Appl. No.: 10/658,231

(22) Filed: Sep. 8, 2003

(51) Int. Cl.
*H04L 9/00* (2006.01)
(52) U.S. Cl. .............................. 713/164; 726/4; 726/21
(58) Field of Classification Search ................ 713/164; 726/4, 21, 1
See application file for complete search history.

(56) References Cited

U.S. PATENT DOCUMENTS 6,233,576 B1 * 5/2001 Lewis ........................... 707/9
2004/0226019 A1 * 11/2004 Tucker et al. ............... 719/310

OTHER PUBLICATIONS

Chris Dalton and Tse Huong Choo, An operating system approach to securing e-services, Communications of the ACM (ISSN:0001-0782) vol. 44, Issue 2 (2001), Retrieved date: Aug. 10, 2007.*

IBM, Technical Disclosure Bulletin, Privilege Control Mechanism for unix systems, vol. 34 No. 7B Dec. 1991, pp. 477-479, retrieved date: Aug. 10, 2007.*

□□Process Righs Management Tutorial, Retrieved date: Aug. 10, 2007□□http://partneradvantage.sun.com/protected/solaris10/adoptionkit/tech/least/tutorial.html.*

* cited by examiner

*Primary Examiner*—Gilberto Barrón, Jr.
*Assistant Examiner*—Samson Lemma
(74) *Attorney, Agent, or Firm*—Martine Penilla & Gencarella, LLP

(57) ABSTRACT

A system for implementing a super-user-compatible privilege security policy on a computer operating system is disclosed. The system includes a kernel for enforcing a security policy on processes, based on privileges. The system also includes a privilege model that interfaces with the kernel and implements a framework in which super-user based processes and privilege based processes transparently interface with the kernel. The privilege model includes several privilege sets associated with each process, a privilege awareness property state associated with each process, the property state indicating whether or not a process is privilege aware, and a software module for automatically modifying the privilege sets and the property state, on a per process basis, based on individual process behavior.

37 Claims, 7 Drawing Sheets

METHOD AND SYSTEM FOR IMPLEMENTING SUPER-USER-COMPATIBLE PRIVILEGES

BACKGROUND

The present invention relates to the field of computer operating system security policy implementation. Specifically, embodiments relate to providing a privilege framework in which traditional super-user based processes and traditional privilege based processes can coexist.

The traditional security policy model for Unix-based operating systems has only one mechanism for distinguishing between privileged processes and unprivileged processes. This mechanism is the association of all privileges to a user having a userid of zero, also known as a "super-user." A basic flaw of this model is the all-or-nothing approach. An application which needs a single special privilege, such as a web server binding to a specific reserved port, a program running in the real-time scheduling class, a server to keep the clock synchronized, etc., all need to run or start with a userid of zero, e.g., as "root".

In the traditional super-user model, a user with userid=0 can read and write to all files. In a traditional privilege model, one process may have the ability to read a file, but not to write to the file, for example. The privileges can be split into sub-privileges. In an operating system, one can typically have either super-user (userid=0), as with traditional Unix operating environments, or traditional privileges.

There have been attempts by Unix vendors to combine the models, but to date, the typical model is based on allowing a system administrator to decide whether the system is to use the traditional super-user model (userid=0) or the traditional privileges model or some combination of both.

SUMMARY

Thus, what is needed is a seamless method of extending privilege security policy, on a per-process basis, to processes designed to run with super-user security policy. What is further needed is a privilege policy for a system that allows traditional super-user based processes and traditional privilege based processes to coexist seamlessly and transparently.

The present invention provides, in various embodiments, a system for implementing a super-user-compatible privilege security policy on a computer operating system. The system includes a kernel for enforcing a security policy on processes, based on privileges. The system also includes a privilege model that interfaces with the kernel and implements a framework in which super-user based processes and privilege based processes transparently interface with the kernel. The privilege model includes several privilege sets associated with each process, a privilege awareness property state associated with each process, the property state indicating whether or not a process is privilege aware, and a software module for automatically modifying the privilege sets and the property state, on a per process basis, based on individual process behavior.

In one embodiment, a method of implementing a super-user-compatible privilege security policy on a computer operating system is disclosed. The method includes automatically extending the novel privilege security policy to super-user policy processes on a per-process basis, and, importantly, the super-user policy processes are unaware of the novel privilege security policy extended to them. The method further includes automatically utilizing the novel privilege security policy for providing privileges for privilege policy processes on the computer operating system on a per-process basis. The privilege policy processes are, however, aware of the privilege security policy, which they are utilizing.

Embodiments of the present invention provide a framework in which processes developed for super-user policies and processes developed for traditional privilege policies can transparently coexist within the same system without modification to their underlying code.

In one embodiment, the super-user policy processes utilize a number of userids that include: a real userid that identifies a user; an effective userid that is utilized by a process for making access control decisions and that has a value of either the real userid or of zero; and a saved userid that allows the effective userid to switch from the value of the real userid to the value of zero when the saved userid has a value of zero.

The privilege security policy processes, according to one embodiment of the present invention, utilize a plurality of sets of privileges that includes: an inheritable set containing those privileges which are inherited when a second process overlays a first process; an effective set containing those privileges that are currently in effect in a process; a permitted set containing those privileges that a process is allowed to put into said effective set at will; and a limit set containing an upper bound of privileges that a process and its sub-processes are allowed to obtain.

Importantly, the present invention also introduces a flag that indicates whether or not the associated process is privilege aware (PA) or not privilege aware (NPA).

In accordance with one embodiment, a super-user policy process, running in a non-privilege-aware state and having an effective userid with a value of zero, as observed by a security-policy-enforcement code, is extended by the effective set of privileges being equated to the limit set of privileges. Also, a super-user policy process, running in a non-privilege-aware state and having an effective userid with a value of zero, or a saved userid with a value of zero, or a real userid with a value of zero, as observed by a security-policy-enforcement code, is extended by the permitted set of privileges being equated to the limit set of privileges.

A process, according to one embodiment of the present invention, transitions from a super-user policy process to a fully privileged process by attaining a privilege-aware state. This can occur automatically by the process manipulating one or all of its privilege sets. A super-user based process having the effective userid equal to zero and transitioning from a non-privilege-aware state to the privilege-aware state does so by copying the limit set of privileges into both the effective set of privileges and the permitted set of privileges.

In one embodiment, a process transitions from the privilege-aware state to the non-privilege-aware state with no restrictions provided all userid's are non-zero. However, if any of the userid's equal zero, a process in the privilege-aware state can only transition to the non-privilege-aware state provided the permitted set of privileges is equal to the limit set of privileges and, if the effective userid is equal to zero, the effective set off privileges is also equal to the limit set of privileges.

According to one embodiment of the present invention, a process may directly manipulate its privileges. However, only a process in a privilege-aware state may manipulate the effective set of privileges. Removing privileges from the effective set is unrestricted, but adding privileges to the effective set of privileges is only allowable provided the privileges to be added are contained within the permitted set of privileges.

As discussed further below, the present invention introduces observed effective sets and observed permitted sets and implemented effective sets and implemented permitted sets on a process-by-process basis. The observed values are those actually used by the operating system in making privilege decisions.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
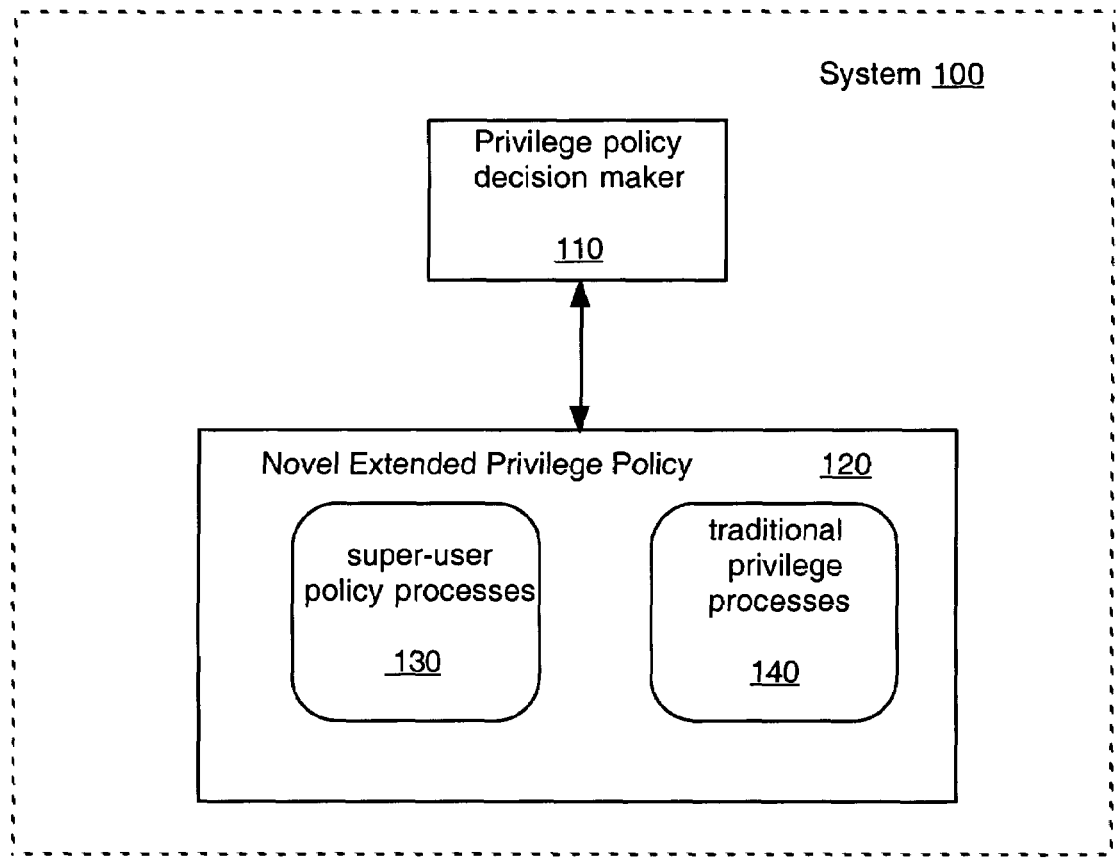
FIG. 1 is a block diagram of a single operating system within which super-user based processes and traditional privilege based processes can transparently coexist, in accordance with one embodiment of the present invention.

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description, numerous specific details are set forth in order to provide a thorough understanding of the present invention through a discussion of embodiments thereof. However, the present invention may be practiced without these specific details. In other instances, well-known methods, procedures, components, and circuits have not been described in detail as not to unnecessarily obscure aspects of the present invention.

Some portions of the detailed descriptions, which follow, are presented in terms of procedures, logic blocks, processing, and other symbolic representations of operations on data bits within an electronic computing device and/or memory system. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "receiving", "processing", "creating", "storing", "copying", "accessing", "generating", "providing", "performing", "manipulating", "sending", "replacing", "gaining", "attaining", "transitioning", or the like, refer to the action and processes of a computer system, or similar electronic computing device, that manipulates and transforms data. The data is represented as physical (electronic) quantities within the computing device's registers and memories and is transformed into other data similarly represented as physical quantities within the computing device's memories or registers or other such information storage, transmission, or display devices.

In one embodiment of the present invention, a method of implementing a super-user-compatible privilege security policy on a computer operating system is herein disclosed. The method includes providing a framework in which super-user based processes are automatically and transparently extended the privilege security policy and can coexist with traditional privilege based processes within a single operating system. The super-user based processes may operate with a lack of awareness of the privilege security policy that is extended to them, while the traditional privilege policy processes are fully aware of the privilege security policy, which they are utilizing.

Certain portions of the detailed descriptions of embodiments of the invention, which follow, are presented in terms of processes and methods. Although specific steps are disclosed herein describing the operations of these processes and methods, such steps are exemplary. That is, embodiments of the present invention are well suited to performing various other steps or variations of the steps recited in the flowcharts of the figures herein.

In accordance with at least one embodiment of the present invention, the security policy model that is evolved is one with which ordinary users can have additional privileges and a user with a userid of zero is no longer all-powerful. For purposes of brevity and clarity, this security policy model will be discussed in the context of a Unix-based operating environment. It should be understood, however, that the present invention is applicable to any operating environment that operates with a privilege security model.

Referring now to FIG. 1, a block diagram of a single operating system 100 within which super-user based processes and traditional privilege based processes can transparently coexist, is presented in accordance with one embodiment of the present invention. Privilege policy decision maker 110 is a kernel process that enforces the rules that govern the extension and modification of privileges. These privileges are extended to processes operating within novel extended privilege policy 120. Novel extended privilege policy 120 can modify allowed privilege sets and a privilege awareness property state, based on the behavior of the individual process. The extension of privileges to processes is performed on a process-by-process basis. Super-user based process 130 and traditional privilege process 140 are representative of a number of processes, having either super-user based security policy or traditional privilege security policy, that can coexist and execute within the novel extended privilege policy domain while remaining transparent to one another. In addition, they can execute while remaining unaware of privileges that have been extended to them and they can transition between a state of awareness of their privileges, a "privilege-aware" state and a state of unawareness of their privileges, a "non-privilege-aware" state.

Embodiments of the present invention provide a framework in which processes developed for super-user policies and processes developed for traditional privilege policies can transparently coexist within the same system without modification to their underlying code. In one embodiment of the present invention, the security policy model is a privilege-awareness model. The privilege state of a process is extended with a Privilege Aware State (pas) that can take the values PA (privilege-aware) and NPA (non-privilege-aware). This pas is in the form of a property that may be set to either PA or NPA by a process when certain conditions are met. These conditions are discussed in detail in conjunction with FIGS. 2-5 below.

According to one embodiment of the present invention, a process running with a privilege security policy has four sets of privileges: an inheritable set (I) that contains those privileges which are inherited when one process image overlays another process image; an effective set (E) that contains those privileges that are currently in effect in a process; a permitted set (P) that contains those privileges that a process is allowed to put into the effective set at will; and a limit set (L) that contains an upper bound of privileges that a process and its sub-processes are allowed to obtain or inherit. L has been added in accordance with one embodiment of the present invention. L is only enforced at the time a new process image overlays the current process image, allowing a process to drop privileges at that time, while still using them until that point in time.

A process running with a super-user security policy model carries with it the following userids: a real userid, an effective userid and a saved userid. The real userid identifies the specific user; the effective userid is used by a process for making access control decisions. The effective userid may have a value of zero, allowing it unlimited access, or the value of the real userid, allowing it only access to the specific user's files. The saved userid allows the effective userid to toggle between the real userid and zero when the saved userid has attained a value of zero. Otherwise, if the saved userid is not zero, the effective userid maintains the value of the real userid.

A concept of observed Effective and Permitted sets, $E^o$ and $P^o$, are used to describe the E and P as observed by the code that enforces the operating system security policy, the process itself and other processes, according to one embodiment of the present invention. The implementation Effective and Permitted sets, $E^I$ and $P^I$, are the sets which are actually stored in the process credential.

Equations 1 and 2 below summarize the way an observer (e.g., privilege policy decision maker 110 of FIG. 1) sees E and P behave in terms of the credential (C) held by the process, the credential indicating the qualifications the process possesses for obtaining access to a set of privileges:

$$C.E^o = C.e \neq 0 \vee C.pas = PA ? C.E^I : C.L \qquad (1)$$

$$C.P^o = (C.e \neq 0 \wedge C.s \neq 0 \wedge C.r \neq 0) \vee C.pas = PA ? C.P^I : C.L \qquad (2)$$

where: C is the process credential; $E^o$ is the observed effective set ($C.E^o$ thus is the process credential of the observed effective set); e is the effective userid; pas is the privilege awareness state; PA is the state of being Privilege Aware; $E^I$ is the implementation effective set; L is the limit set; $P^o$ is the observed permitted set; s is the saved userid; r is the real userid; and $P^I$ is the implementation permitted set.

In equation (1), according to one embodiment of the present invention, an observer sees the credentials of the effective set as the same as that of the implementation effective set provided either the effective userid is not equal to zero or the privilege awareness state is PA. Otherwise, the value of $E^o$ is set to that of the limit set, L. An alternate way of stating this observation rule is that a super-user policy process running in an NPA state and having a userid of zero, as observed by a security-policy-enforcement code, is extended the effective set of privileges that is the limit set. Otherwise, $E^o$ is equal to $E^I$.

In equation (2) above, an observer sees the credentials of the permitted set as those of $P^I$, provided either none of the userids are equal to zero or the privilege awareness state is PA, according to one embodiment of the present invention. Otherwise, the value of $P^o$ is set to L. An alternate version of this observation rule is that a super-user policy process, running in a non-privilege-aware state and having any of its userids equal to zero, as observed by a security-policy-enforcement code, is extended the permitted set of privileges that is the limit set. Otherwise, $P^o$ is equal to $P^I$.

In one embodiment, the initial process starts off with $E^I$ equal to $P^I$ which is equal to I which is equal to $I^o$ and L equal to all privileges. $I^o$ is the set of basic privileges which can be empty. This default process credential behaves exactly like the super-user model. That is, when the effective userid is non-zero, the process has the default privileges; when the effective userid is zero, the process has all privileges.

Embodiments of the present invention provide a framework in which processes developed for super-user policies and processes developed for traditional privilege policies can transparently coexist within the same system without modification to their underlying code. Therefore, when processes developed for super-user policies need to start programs developed for traditional privilege policies, and vice versa, it can become necessary for a process to change its privilege awareness state (pas) to one compatible with the process with which it is interacting.

Figure 2:
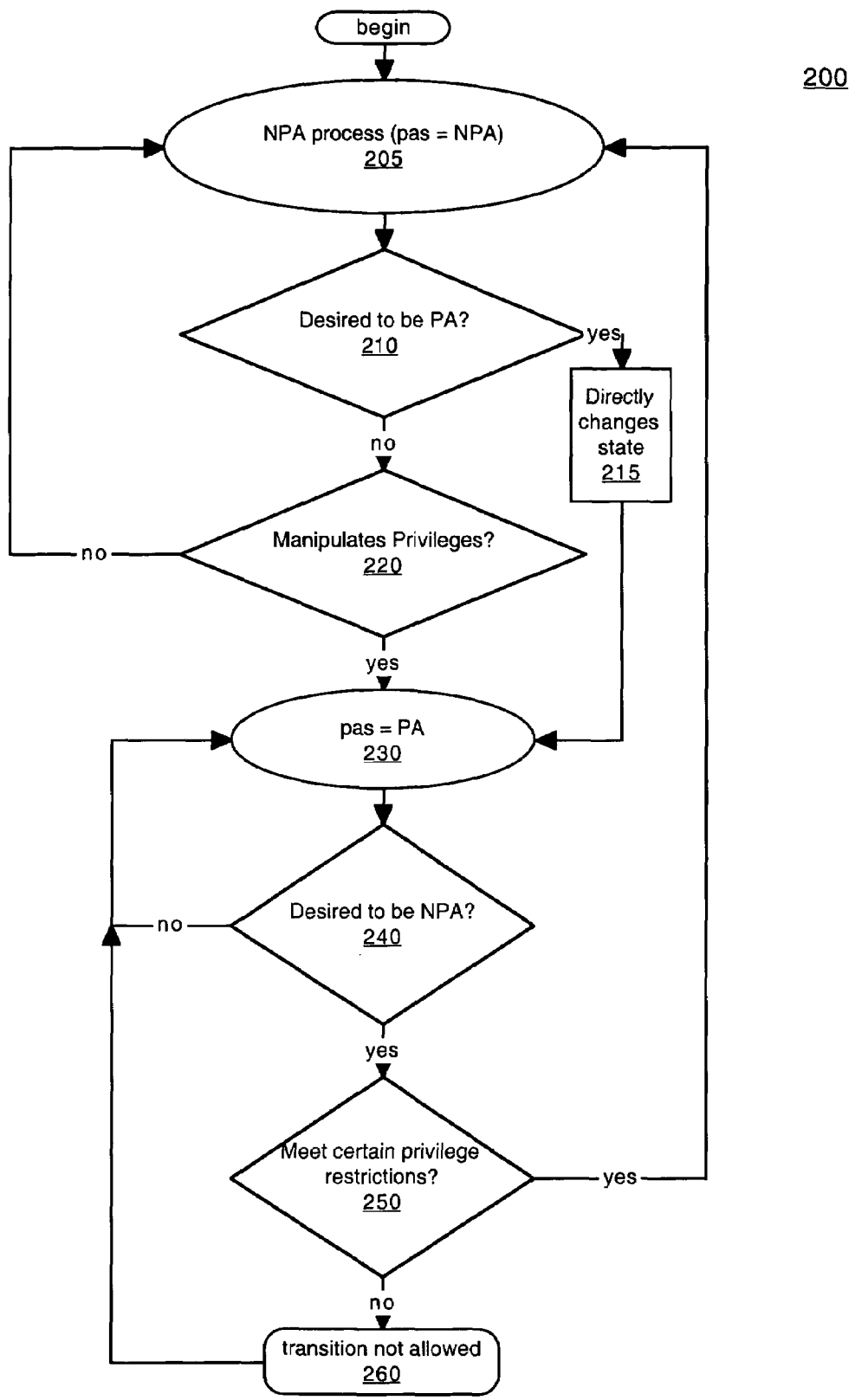
FIG. 2 is a flow diagram illustrating an overview of changes in the privilege-aware state of processes, according to one embodiment of the present invention.

FIG. 2 is a flow diagram 200 illustrating an overview of changes in the privilege aware state (pas) of processes, according to one embodiment of the present invention. The pas is a state variable that is set to indicate the privilege aware state to the privilege policy decision maker (e.g., 110 of FIG. 1). Processes can change their pas. Changing pas is mostly automatic and restricted. As shown in step 205, a process that is operating unaware of privileges has a pas of NPA (not privilege aware).

Still referring to FIG. 2, at step 210, a process operating in an NPA state can directly change its state to that of privilege aware (PA) if it becomes necessary for an operation, according to one embodiment of the present invention.

This is shown by the path through step 215 that ends at step 230 with the privilege aware state variable changed to PA.

In step 220 of FIG. 2, in one embodiment, when an NPA process manipulates privileges (e.g., E or P) it becomes privilege aware automatically and pas becomes PA, as shown in step 230. Otherwise, it continues to operate as a NPA process. If it does manipulate E or P, then the observed privilege sets, $E^o$ and $P^o$ become decoupled from the Limit set, L. Similarly, if L is changed, then $E^o$ and $P^o$ must remain unchanged which can only be achieved by a change to PA (see equations 1 and 2 above).

There are some situations in which a process may need to lose its privilege aware state (e.g., when a copy of an application is being overlaid with another application, such as upon an "exec(2)" Unix system call). In step 240 of FIG. 2, if a PA process needs to become NPA in order to perform an operation, it may change its state variable only if it meets certain restrictions, as shown by step 250. The change from PA to NPA is not automatic. In step 250, a PA process can only become NPA if it meets certain restrictions. For example, a PA process can only become NPA if E and P can be adjusted in a manner that keeps $E^o$ and $P^o$ unchanged and when such a change does not lead to the process leveraging a userid of zero into full privileges. Provided these restrictions are met, then a PA process is allowed to change the process state variable and transition to NPA as shown by the path to step 210. Otherwise, step 260 is entered and the transition is not allowed, and thus the process state variable remains set to PA as shown by the path to step 230.

Figure 3:
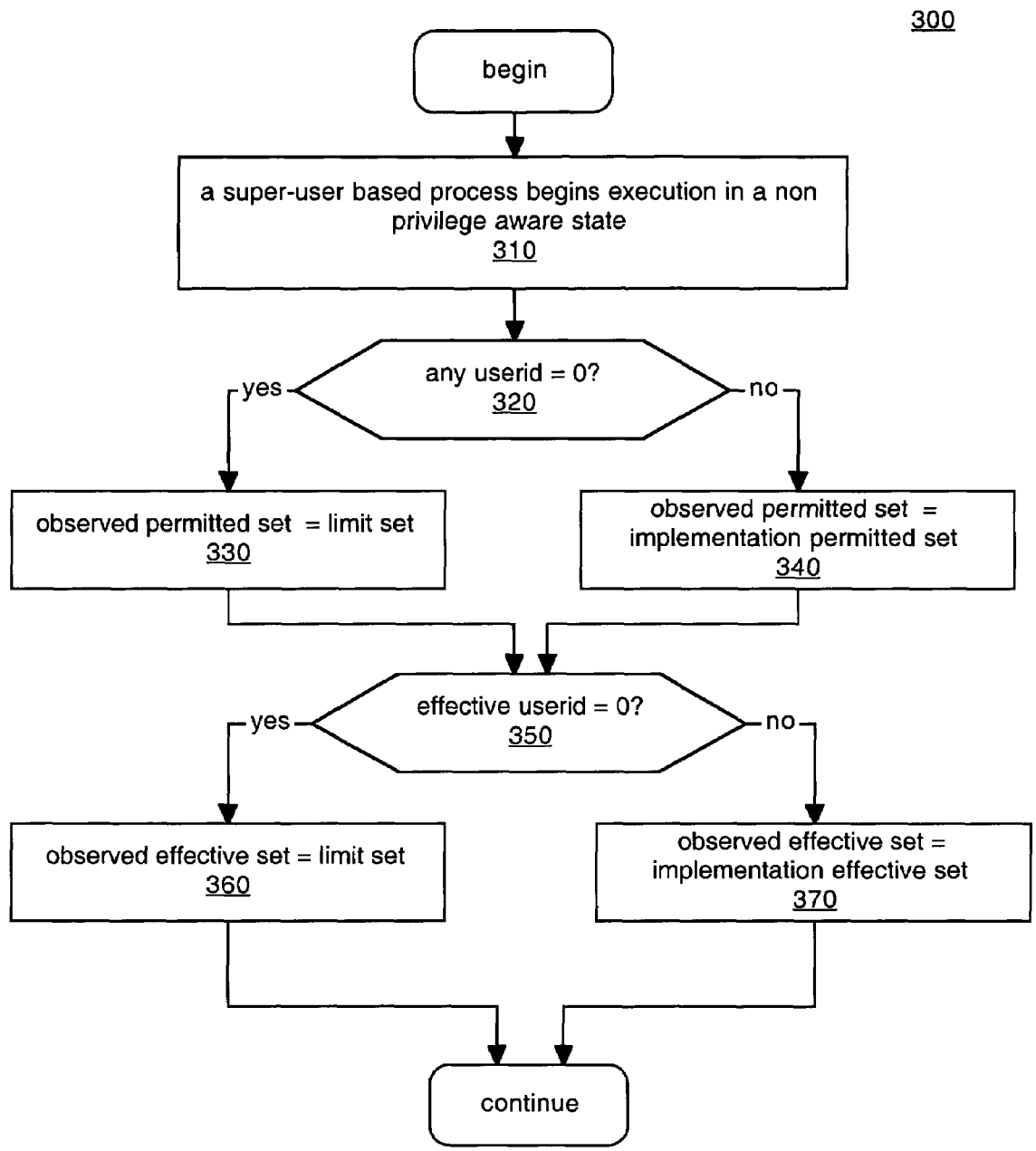
FIG. 3 is a flow diagram illustrating a super-user policy process operating in a non-privilege-aware state within a novel extended privilege policy system; according to one embodiment of the present invention.

In order to understand the operation of a super-user policy process in a novel extended privilege policy system, FIG. 3 is presented. FIG. 3 is a flow diagram illustrating a super-user policy process 300 operating in a non-privilege-aware (NPA) state within a novel extended privilege policy system, according to one embodiment of the present invention. In this process, privilege policy is extended to super-user policy processes on a per-process basis. In step 310, a super-user policy process begins execution in a NPA state. In accordance with one embodiment of the present invention, when a super-user policy process executes, the operating system will recognize it as a super-user based process and will automatically extend it privileges based on the configuration of its userids (user identifications).

In step 320 of FIG. 3, in accordance with one embodiment of the present invention, a check is performed as to whether any of the userids are equal to zero. If so, the method moves to step 330. If not, method 300 moves to step 340. In step 330, since there is at least one userid equal to zero, the permitted set (C.P) that is being observed becomes equal to the limit set (C.L), thus allowing all privileges in the limit set to be permitted. However, in step 340, if no userids were zero, the permitted set (C.P) retains the value of the implementation permitted set. This process is performed by the novel extended privilege policy (e.g., 120 of FIG. 1) in conjunction with privilege policy decision maker (110 of FIG. 1), without the super-user process being aware.

In step 350 of method 300, if a super-user policy process has an effective userid of zero, the effective set (C.E) that is being observed by the system's security policy becomes equal to the limit set (C.L) as shown in step 360, in accordance with one embodiment of the present invention. Thus, a super-user based process having its effective userid equal to zero is extended the limit set (C.L) of privileges for both the effective set (C.E) and the permitted set (C.P).

Still referring to FIG. 3, in step 370 of method 300, according to one embodiment of the present invention, if the effective userid is not equal to zero, the effective set (C.E) retains the implementation effective set of privileges. At this point the process continues to execute as always, unaware of the privilege sets that have been allocated, and process 300 is exited.

In summary of FIG. 3, according to one embodiment of the present invention, a process running in an NPA state behaves almost exactly like a traditional super-user based process. It may have privileges in E and P, and the operating system will honor those, but if the process's userid becomes set to zero, the upper bound of that process's privileges, L, will be observed to replace whatever value is in E. Similarly, if any process's userid becomes zero, L is used as $P^o$. The observer will see $E^o$ follow the transition of the effective userid and it will see $P^o$ revert when all of the process's userids are no longer zero. In contrast, the implementation sets $E^I$ and $P^I$ remain unchanged during userid manipulations.

Figure 4:
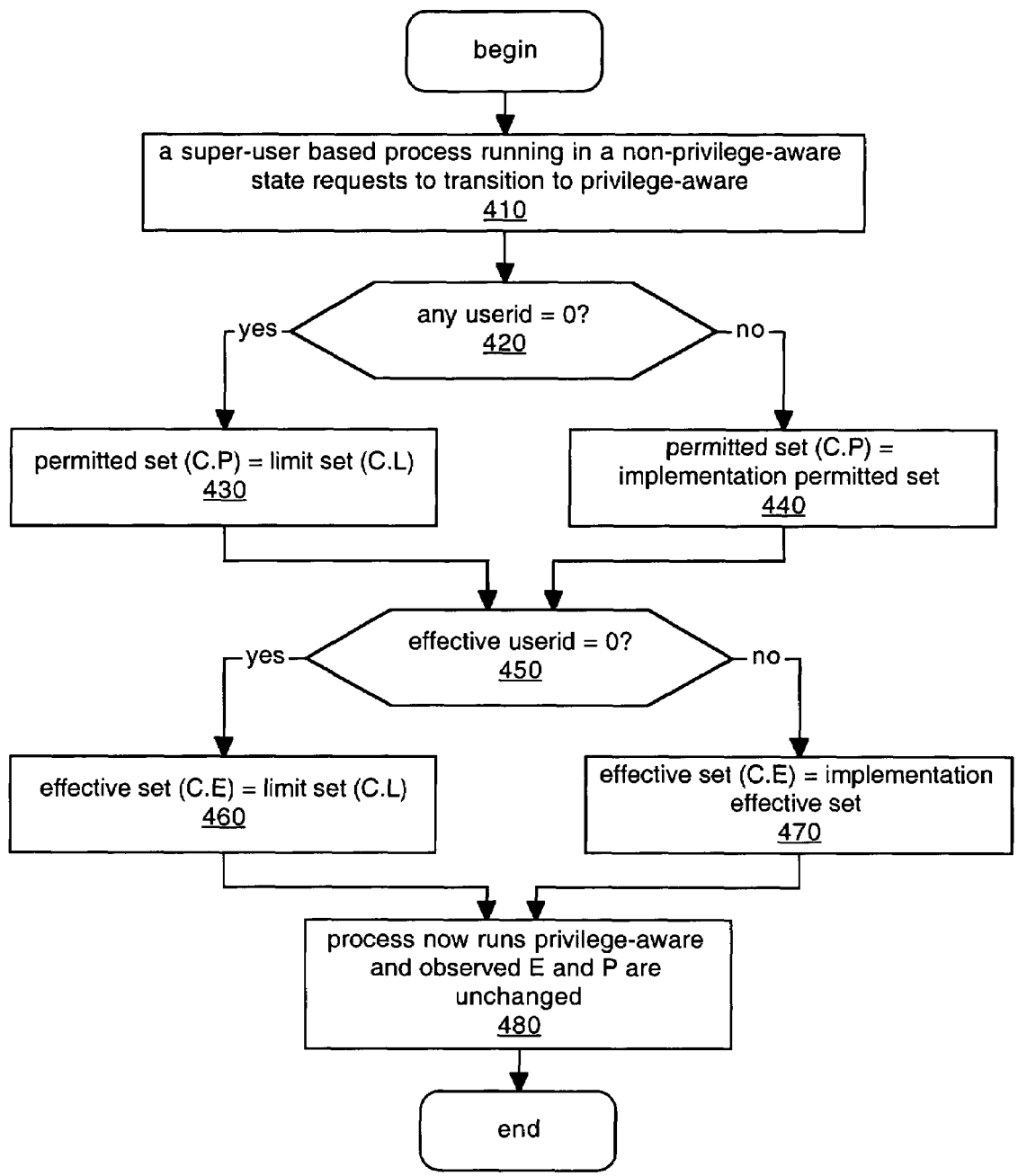
FIG. 4 is a flow diagram of a method of transitioning from a non-privilege-aware state to a privilege-aware state, according to one embodiment of the present invention.

To further understand how a process changes from running in a non-privilege aware state to becoming privilege-aware, FIG. 4 is presented. FIG. 4 is a flow diagram of a method 400 of transitioning from a non-privilege-aware state to a privilege-aware state, according to one embodiment of the present invention. Basically, there are no restrictions on becoming PA. In step 410 of FIG. 4, a super-user based process is running in a NPA state and needs to transition to PA. The following steps indicate the changes to the process credentials, which occur.

In step 420 of FIG. 4, in accordance with one embodiment of the present invention, a check is performed as to whether any of the userids are equal to zero. If so, the method moves to step 430. If not, method 400 moves to step 440. In step 430, since there is at least one userid equal to zero, the permitted set that is being implemented becomes equal to the limit set, thus allowing all privileges to be permitted. However, in step 440, if no userids were zero, the permitted set retains the value of the default implementation set.

In step 450 of method 400, if a super-user policy process transitioning from NPA to PA has an effective userid of zero, the privileges of the limit set are copied into the effective set to be implemented as shown in step 460 in accordance with one embodiment of the present invention. Thus, a super-user based process having its effective userid equal to zero and transitioning from a non-privilege-aware state to a privilege aware state copies the limit set of privileges into to both the effective set and the permitted set.

Still referring to FIG. 4, in step 470 of method 400, according to one embodiment of the present invention, if the effective userid is not equal to zero, the effective set retains the default implementation effective set of privileges. In step 480, the previously NPA process now runs in a fully privilege-aware state and, thus, can manipulate privileges directly. The observed effective and permitted sets ($E^o$ and $P^o$) remain unchanged. At this point userid manipulations no longer effect on the privilege status and method 400 is exited.

Figure 5:
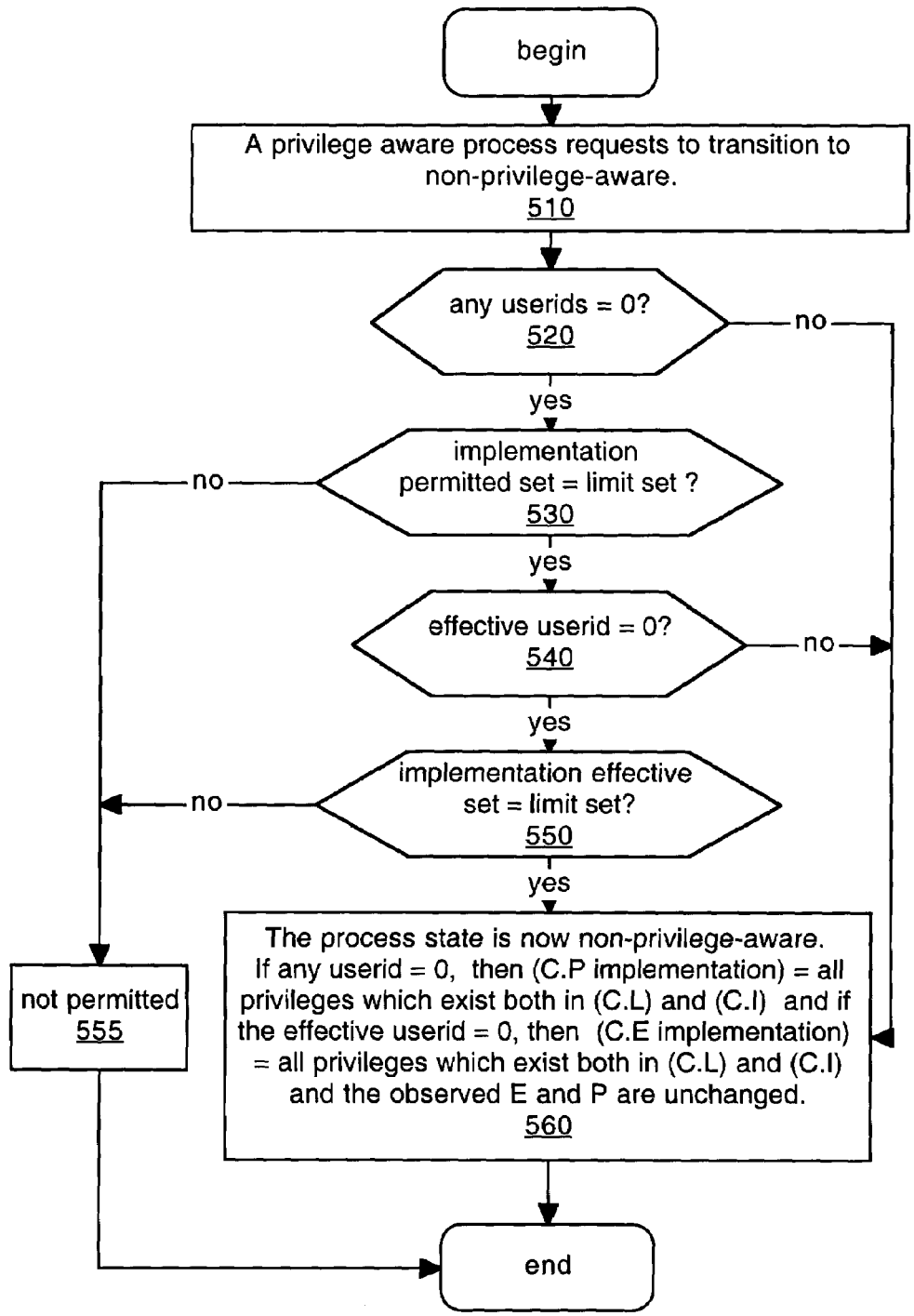
FIG. 5 is a flow diagram of a method of transitioning from a privilege-aware state to a non-privilege-aware state, according to one embodiment of the present invention.

To more thoroughly explain the transitioning of a process from a privilege aware state to a non-privilege aware state, FIG. 5 is presented. FIG. 5 is a flow diagram of a method 500 of transitioning from a privilege-aware state to a non-privilege-aware state, according to one embodiment of the present invention. There are some situations in which a process may need to lose its privilege aware state (e.g., when a copy of an application is being overlaid with another application, such as upon an "exec(2)" system call). Several restrictions apply when a PA state transitions to an NPA state, as not all combinations of privilege sets can be successfully and safely converted to an equivalent NPA process.

In step 510 of method 500, according to one embodiment, a process in a privilege-aware state wishes to transition to a non-privilege-aware state. At step 520, a check is performed to see if any userids are set to zero. If none of the userids (effective, real or saved) are equal to zero, then there are no restrictions and the transition is permitted and method 500 moves to step 560. However, if any of the userids are equal to zero, there are restrictions that apply and the other steps must be followed.

In step 530 of FIG. 5, if the implementation permitted set, $P^I$ is the same as the limit set, then there are no further restrictions, according to one embodiment of the present invention, and method 500 moves to step 540. However, if $P^I$ is not equal to the limit set, then method 500 moves to step 555 and the transition to NPA is not permitted.

In step 540, provided $P^I$ equals the limit set, the effective userid is interrogated. In one embodiment of the present invention, if it is found that the effective userid is not equal to zero, the transition is permitted and method 500 moves to step 560. However, if the effective userid is equal to zero, then the implementation effective set, $E^I$ must also be equal to the limit set as shown in step 550 of FIG. 5.

Still referring to FIG. 5, if the implementation effective set $E^I$ is not equal to the limit set, L, then, according to one embodiment of the present invention, the transition to NPA is not allowed and method 500 moves to step 555 and then is exited. Otherwise, the transition is allowed and step 560 is entered. In step 560, the process state is now NPA. Either no userids are equal to zero or, if any of the userids are equal to zero, the implementation permitted set is granted only those privileges in the intersection of the limit set and the inheritable set. Also, if the effective userid is equal to zero, the implementation effective set is granted only those privileges in the intersection of the limit set and the inheritable set. It should be understood that, under these operations, the observed sets, $E^o$ and $P^o$, remain unchanged.

There are various times, according to one embodiment of the present invention, at which the per-process state changes, either as a result of explicit actions, or as a side effect of other actions. When userids change the changes are only observed and are not actually reflected in the underlying data structures.

In all circumstances, according to one embodiment, the actual implementation sets remain unchanged. In PA processes, when userids change, no changes are observed by the observed sets $E^o$ and $P^o$. In processes having no userids set to zero, no changes are observed, even if privileges are used to obtain a userid of zero. Then, in NPA processes, the $E^o$ will alternate between L and the $E^I$, depending on the value of the effective userid, and $P^o$ will appear as L until the last userid is set to non-zero, in which case it will revert to the privileges of $P^I$.

Figure 6:
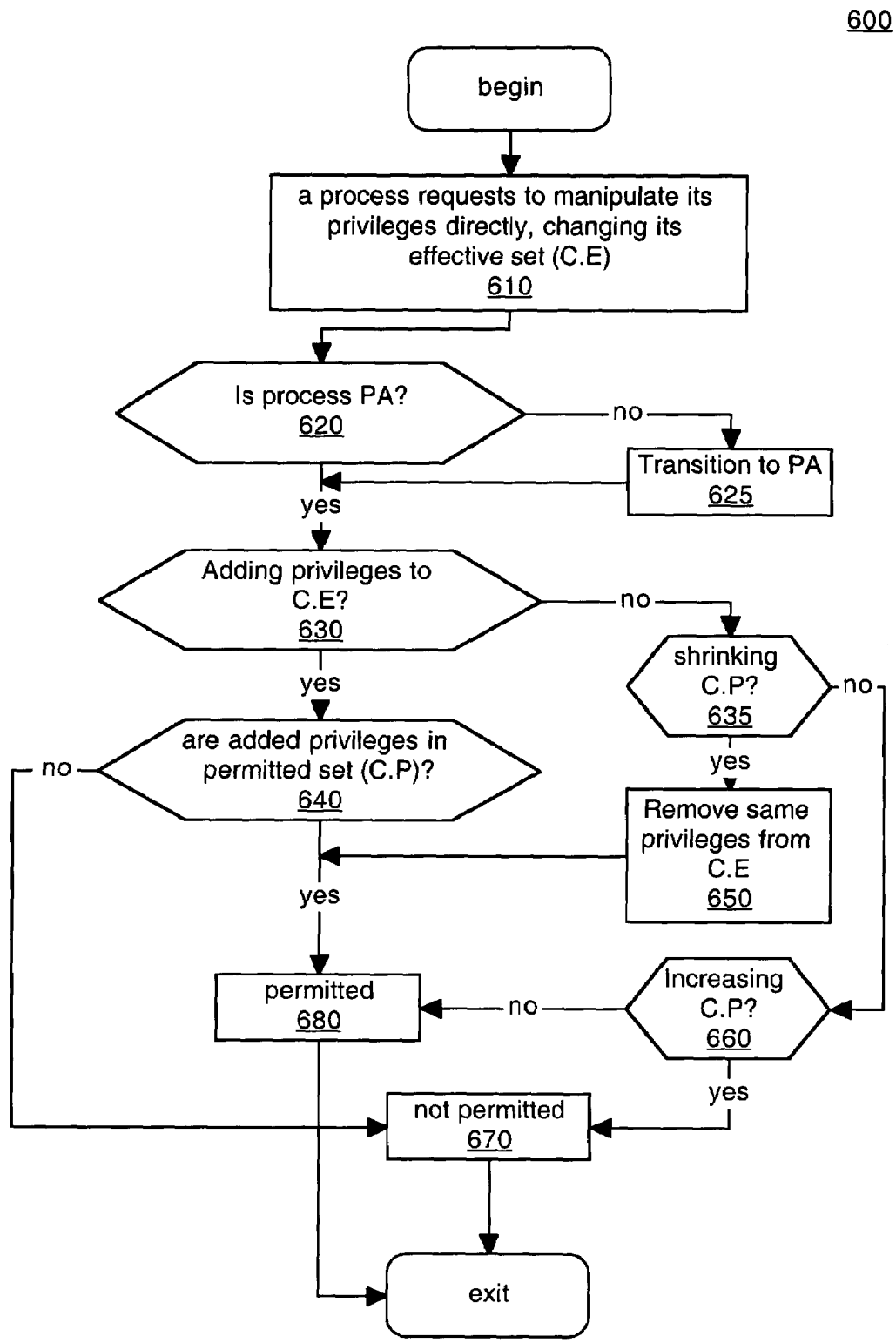
FIG. 6 is a flow diagram of a method of a process directly manipulating its privileges, in accordance with one embodiment of the present invention.

FIG. 6 is a flow diagram of a method 600 for a process to directly manipulate its privileges, changing its effective set, in accordance with one embodiment of the present invention. In step 610 of method 600, a process wishes to manipulate its privileges directly, changing the credentials of its effective set. If the process is PA, as examined at step 620, then method 600 moves to step 630. If the process is NPA then method 600 moves to step 625 and the process transitions to PA using the method described in FIG. 2. Once the process becomes PA, then it moves to step 630.

At step 630 of FIG. 6, the process is interrogated, according to one embodiment of the present invention, regarding whether it is adding privileges to the effective set. If privileges are being added to E, then method 600 moves to step 640. If privileges are not being added to the effective set, then, at step 635, the process is interrogated as to whether it is removing privileges from P. If the process is not shrinking P, a check is performed at step 660 as to whether it is increasing P. If not, then there are no restrictions and method 600 moves to step 680 and method 600 is then exited. If it is wishing to increase P, then method 600 proceeds to step 670 and the change is not permitted.

If, at step 635, privileges were being removed from P, then method 600 moves to step 650 where it removes the same privileges from E, in accordance with one embodiment of the present invention. Then method 600 may move to step 680 and the privilege change is permitted, after which method 600 is exited.

In one embodiment, if privileges are being added to the credentials of E at step 630, then the permitted set, P, is interrogated at step 640 for the privileges to be added. If the privileges to be added are in P, then method 600 proceeds to step 680 where the change is permitted and method 600 is then exited. However, if the privileges to be added are not in P, then method 600 proceeds to step 670 and the change is not permitted. Method 600 is then exited.

The foregoing discussion with respect to FIG. 6 treated changing the effective set of privileges according to one embodiment of the present invention. It should be understood that other privilege sets can also be directly manipulated. Removing privileges from E is not restricted, but only privileges in P may be added to E. A process manipulating E needs to be PA, and if it is NPA, it will transition to PA following the method described in FIG. 2. P can only be shrunk. A process so designed will shrink P if it has no future need for certain privileges in P. Privileges removed from P are automatically removed from E and NPA processes manipulating P will automatically transition to PA.

In one embodiment, the inheritable set, I, may be changed. Privileges from P may be added freely to I and privileges may be removed from I without restriction. Since changing I does not influence $E^o$ and $P^o$, an NPA process does not need to transition to PA when manipulating 1. Removing privileges from P does not effect I (e.g., I is allowed to be a superset of P).

According to one embodiment of the present invention, privileges may not be added to the limit set by any mechanism. Privileges may be removed from the limit set, but with extreme caution as applications running with userid equal zero usually assume full privileges on the operating system. This often leads to no error checking being performed for privileged operations. Changing the limit set influences $E^o$ and $P^o$ and, as a result, an NPA process needs to transition to PA when manipulating L.

According to one embodiment of the present invention, a process that manipulates its privileges is so marked in order to award the process additional protection. It should also be noted that, in another embodiment, using certain commands (e.g., "getpflags" and "setpflags") processes may query and change the privilege aware state of a process.

Figure 7:
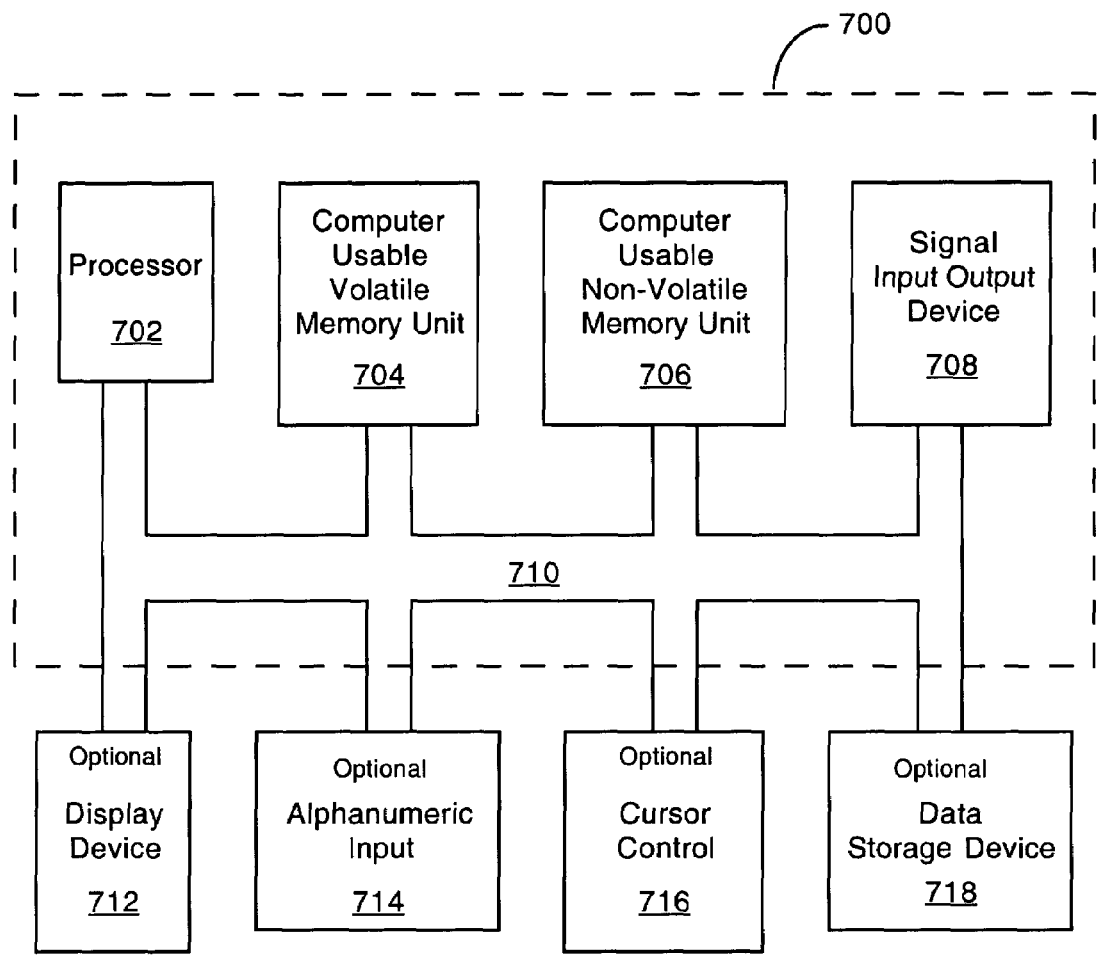
FIG. 7 is a block diagram of an exemplary computer system used in accordance with one embodiment of the present invention.

With reference now to FIG. 7, a block diagram of an embodiment of an exemplary computer system 700, used in accordance with the present invention, is illustrated. It should be appreciated that system 700 is not strictly limited to be a computer system. As such, system 700 of the present embodiment is well suited to be any type of computing device (e.g., server computer, portable computing device, desktop computer, etc.). Within the following discussions of the present invention, certain processes and steps are discussed that are realized, in one embodiment, as a series of instructions (e.g., software program) that reside within computer readable memory units of computer system 700 and executed by a processor(s) of system 700. When executed, the instructions cause computer 700 to perform specific actions and exhibit specific behavior that is described in detail herein.

Computer system 700 of FIG. 7 comprises an address/data bus 710 for communicating information, one or more central processors 702, e.g., privilege policy decision maker 110, coupled with bus 710 for processing information and instructions. Central processor unit(s) 702 may be a microprocessor or any other type of processor. The computer 700 also includes data storage features such as a computer usable volatile memory unit 704 (e.g., random access memory, static RAM, dynamic RAM, etc.) coupled with bus 710 for storing information and instructions for central processor(s) 702, a computer usable non-volatile memory unit 706 (e.g., read only memory, programmable ROM, flash memory, EPROM, EEPROM, etc.) coupled with bus 710 for storing static information and instructions for processor(s) 702. System 700 also includes one or more signal generating and receiving devices 708 coupled with bus 710 for enabling system 700 to interface with other electronic devices and computer systems. The communication interface(s) 708 of the present embodiment may include wired and/or wireless communication technology.

Optionally, computer system 700 may include an alphanumeric input device 714 including alphanumeric and function keys coupled to the bus 710 for communicating information and command selections to the central processor(s) 702. The computer 700 can include an optional cursor control or cursor directing device 716 coupled to the bus 710 for communicating user input information and command selections to the central processor(s) 702.

The system 700 of FIG. 7 may also include one or more optional computer usable data storage devices 718 such as a magnetic or optical disk and disk drive (e.g., hard drive or floppy diskette) coupled with bus 710 for storing information and instructions. An optional display device 712 is coupled to bus 710 of system 700 for displaying video and/or graphics. It should be appreciated that optional display device 712 may be a cathode ray tube (CRT), flat panel liquid crystal display (LCD), field emission display (FED), plasma display or any other display device suitable for displaying video and/or graphic images and alphanumeric characters recognizable to a user.

Thus, the present invention provides, in various embodiments, a method and system for implementing super-user-compatible privileges. The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer system for processing privileges, comprising:
   a kernel for enforcing a security policy on a plurality of processes based on privileges;
   a memory for storing a privilege model; and
   a central processor unit for executing the privilege model stored in the memory, the privilege model interfacing with said kernel and implementing a framework in which super-user based processes of said plurality of processes and privilege based processes of said plurality of processes transparently interface with said kernel, wherein said privilege model comprises:
      a plurality of privilege sets associated with each process of said plurality of processes; and
      a privilege awareness property state associated with each process of said plurality of processes for indicating whether or not a process is privilege aware;
   wherein the framework includes a software module for automatically modifying said plurality of privilege sets and said privilege awareness property state, on a per process basis, based on individual process behavior.

2. A system as described in claim 1 wherein said plurality of privilege sets associated with each process comprises:
   an effective set indicating privileges in effect for said process;
   a permitted set indicating privileges that can be made effective; and
   a limit set indicating an upper bound on all effective sets.

3. A system as described in claim 1 wherein each process comprises:
   an effective user identification;
   a real user identification; and
   a saved user identification.

4. A system as described in claim 2 wherein each process comprises:
   an effective user identification;
   a real user identification; and
   a saved user identification.

5. A system as described in claim 1 wherein said software module automatically updates a privilege awareness property state of a process to indicate that said process is privilege aware in response to said process accessing any of its own plurality of privilege sets.

6. A system as described in claim 4 wherein said software module automatically modifies a plurality of privilege sets for a privilege unaware super-user based process according to the following rules:
   if an effective user identification of said super-user based process becomes zero, then an effective set of said super-user based process is assigned to a limit set of said super-user based process;
   if any user identification value of said super-user based process becomes zero, then a permitted set of said super-user based process is assigned to said limit set of said super-user based process; and
   if said effective user identification of said super-user based process becomes non-zero, then said effective set of said super-user based process reverts back to an original state.

7. A system as described in claim 6 wherein said software module automatically modifies said plurality of privilege sets for said privilege unaware super-user based process according to the following additional rule:
   if all user identification values of said super-user based process become non-zero, then said permitted set of said super-user based process reverts back to an original state.

8. A system as described in claim 4 wherein said software module automatically modifies a plurality of privilege sets for a privilege unaware super-user based process transitioning to being privilege aware according to the following rules:
  if an effective user identification of said super-user based process is zero, then an effective set of said super-user based process is assigned to a limit set of said super-user based process;
  if any user identification value of said super-user based process is zero, then a permitted set of said super-user based process is assigned to said limit set of said super-user based process; and
  if an effective user identification of said super-user based process is non-zero, then said effective set of said super-user based process remains at an initial state.

9. A system as described in claim 4 wherein said software module automatically modifies a plurality of privilege sets for a privilege aware super-user based process transitioning to being privilege unaware according to the following rules:
  if any user identification value of said super-user based process is zero, then a permitted set of said super-user based process is assigned to said limit set of said super-user based process; and
  if an effective user identification of said super-user based process is zero, then an effective set of said super-user based process is assigned to a limit set of said super-user based process.

10. A system as described in claim 4 wherein said software module does not alter any of a plurality of privilege sets of a privilege aware super-user based process in response to changes in any of its user identification values.

11. A system as described in claim 4 wherein said software module allows a privilege aware super-user based process to transition to a privilege unaware super-user based process without restrictions provided all its user identification values are non-zero.

12. A system as described in claim 4 wherein a process of said plurality of processes can directly modify its plurality of privilege sets except as limited by the following rules:
  only privileges of a permitted set of said process can be added to an effective set of said process;
  privileges may not be added to said permitted set of said process;
  privileges removed from said permitted set of said process are automatically removed from said effective set of said process; and
  privileges may not be added or subtracted from a limit set of said process.

13. A system as described in claim 2 wherein said plurality of privilege sets associated with each process further comprises an inheritable set indicating privileges which are inherited when a second process overlay a first process.

14. A method of processing privileges comprising:
  enforcing a security policy on a plurality of processes based on privileges, said enforcing performed by a kernel of an operating system; and
  transparently interfacing super-user based processes of said plurality of processes and privilege based processes of said plurality of processes with said kernel using a privilege model as an intermediary, wherein said privilege model comprises:
    a plurality of privilege sets associated with each process of said plurality of processes; and
    a privilege awareness property state associated with each process of said plurality of processes for indicating whether or not a process is privilege aware; and
  wherein said transparently interfacing further comprises automatically modifying said plurality of privilege sets and said privilege awareness property state, on a per process basis, based on individual process behavior.

15. A method as described in claim 14 wherein said plurality of privilege sets associated with each process comprises:
  an effective set indicating privileges in effect for said process;
  a permitted set indicating privileges that can be made effective; and
  a limit set indicating an upper bound on all effective sets.

16. A method as described in claim 14 wherein each process comprises:
  an effective user identification;
  a real user identification; and
  a saved user identification.

17. A method as described in claim 15 wherein each process comprises:
  an effective user identification;
  a real user identification; and
  a saved user identification.

18. A method as described in claim 14 wherein said automatically modifying further comprises automatic updating of a privilege awareness property state of a process to indicate that said process is privilege aware in response to said process accessing any of its own plurality of privilege sets.

19. A method as described in claim 15 wherein said automatically modifying further comprises automatically modifying a plurality of privilege sets for a privilege unaware super-user based process according to the following rules:
  if an effective user identification of said super-user based process becomes zero, then an effective set of said super-user based process is assigned to a limit set of said super-user based process;
  if any user identification value of said super-user based process becomes zero, then a permitted set of said super-user based process is assigned to said limit set of said super-user based process; and
  if said effective user identification of said super-user based process becomes non-zero, then said effective set of said super-user based process reverts back to an original state.

20. A method as described in claim 19 wherein said automatically modifying a plurality of privilege sets for a privilege unaware super-user based process is performed according to the following additional rule:
  if all user identification values of said super-user based process become non-zero, then said permitted set of said super-user based process reverts back to an original state.

21. A method as described in claim 17 wherein said automatically modifying further comprises automatically modifying a plurality of privilege sets for a privilege unaware super-user based process transitioning to being privilege aware according to the following rules:
  if an effective user identification of said super-user based process is zero, then an effective set of said super-user based process is assigned to a limit set of said super-user based process;
  if any user identification value of said super-user based process is zero, then a permitted set of said super-user based process is assigned to said limit set of said super-user based process; and if an effective user identification of said super-user based process is non-zero, then said effective set of said super-user based process reverts remains at initial state.

22. A method as described in claim 17 wherein said automatically modifying further comprises automatically modifying a plurality of privilege sets for a privilege aware super-user based process transitioning to being privilege unaware according to the following rules:

if any user identification value of said super-user based process is zero, then a permitted set of said super-user based process is assigned to said limit set of said super-user based process; and if an effective user identification of said super-user based process is zero, then an effective set of said super-user based process is assigned to a limit set of said super-user based process.

23. A method as described in claim 17 wherein said automatically modifying does not alter any of a plurality of privilege sets of a privilege aware super-user based process in response to changes in any of its user identification values.

24. A method as described in claim 17 wherein said transparently interfacing further comprises allowing a privilege aware super-user based process to transition to a privilege unaware super-user based process without restrictions provided all its user identification values are non-zero.

25. A method as described in claim 17 wherein said transparently interfacing further comprises allowing a process of said plurality of processes to directly modify its plurality of privilege sets except as limited by the following rules:

only privileges of a permitted set of said process can be added to an effective set of said process;

privileges may not be added to said permitted set of said process;

privileges removed from said permitted set of said process are automatically removed from said effective set of said process; and privileges may not be added or subtracted from a limit set of said process.

26. A method as described in claim 25 wherein said plurality of privilege sets associated with each process further comprises an inheritable set indicating privileges which are inherited when a second process overlays a first process.

27. A computer system for processing privileges, comprising:

a kernel for enforcing a security policy on a plurality of processes based on privileges;

a memory for storing a privilege model; and a central processor unit for executing the privilege model stored in the memory, the privilege model implementing a framework configured for transparently interfacing super-user based processes of said plurality of processes and privilege based processes of said plurality of processes with said kernel, wherein said privilege model comprises:

a plurality of privilege sets associated with each process of said plurality of processes, wherein said plurality of privilege sets comprises:

an effective set indicating privileges in effect;

a permitted set indicating privileges that can be made effective; and a limit set indicating an upper bound on all effective sets;

a privilege awareness property state associated with each process of said plurality of processes for indicating whether or not a process is privilege aware;

wherein the framework includes a software module for automatically modifying said plurality of privilege sets and said privilege awareness property state, on a per process basis, based on individual process behavior.

28. A system as described in claim 27 wherein each process comprises:

an effective user identification;

a real user identification; and a saved user identification.

29. A system as described in claim 28 wherein said plurality of privilege sets associated with each process further comprises an inheritable set indicating privileges which are inherited when a second process overlays a first process.

30. A system as described in claim 27 wherein said software module automatically updates a privilege awareness property state of a process to indicate that said process is privilege aware in response to said process accessing any of its own plurality of privilege sets.

31. A system as described in claim 28 wherein said software module automatically modifies a plurality of privilege sets for a privilege unaware super-user based process according to the following rules:

if an effective user identification of said super-user based process becomes zero, then an effective set of said super-user based process is assigned to a limit set of said super-user based process;

if any user identification value of said super-user based process becomes zero, then a permitted set of said super-user based process is assigned to said limit set of said super-user based process; and if said effective user identification of said super-user based process becomes non-zero, then said effective set of said super-user based process reverts back to an original state.

32. A system as described in claim 31 wherein said software module automatically modifies said plurality of privilege sets for said privilege unaware super-user based process according to the following additional rule:

if all user identification values of said super-user based process become non-zero, then said permitted set of said super-user based process reverts back to an original state.

33. A system as described in claim 28 wherein said software module automatically modifies a plurality of privilege sets for a privilege unaware super-user based process transitioning to being privilege aware according to the following rules:

if an effective user identification of said super-user based process is zero, then an effective set of said super-user based process is assigned to a limit set of said super-user based process;

if any user identification value of said super-user based process is zero, then a permitted set of said super-user based process is assigned to said limit set of said super-user based process; and if an effective user identification of said super-user based process is non-zero, then said effective set of said super-user based process remains at an initial state.

34. A system as described in claim 28 wherein said software module automatically modifies a plurality of privilege sets for a privilege aware super-user based process transitioning to being privilege unaware according to the following rules:

if any user identification value of said super-user based process is zero, then a permitted set of said super-user based process is assigned to said limit set of said super-user based process; and if an effective user identification of said super-user based process is zero, then an effective set of said super-user based process is assigned to a limit set of said super-user based process.

35. A system as described in claim 28 wherein said software module does not alter any of a plurality sets of a privilege aware super-user based process in response to changes in any of its user identification values.

36. A system as described in claim 28 wherein said software module allows a privilege aware super-user based process to transition to a privilege unaware super-user based process without restrictions provided all its user identification values are non-zero.

37. A system as described in claim 28 wherein a process of said plurality of processes can directly modify its plurality of privilege sets except as limited by the following rules:

only privileges of a permitted set of said process can be added to an effective set of said process;

privileges may not be added to said permitted set of said process;

privileges removed from said permitted set of said process are automatically removed from said effective set of said process; and privileges may not be added to or subtracted from a limit set of said process.

* * * * *